United States Patent [19]
Thuma

[11] Patent Number: 6,012,837
[45] Date of Patent: Jan. 11, 2000

[54] INTEGRATED DUAL MIXING ACTION STIRRING BLENDER

[76] Inventor: Michael C. Thuma, 398 S. Cumberland Pkwy., Des Plaines, Ill. 60016

[21] Appl. No.: 09/229,466

[22] Filed: Jan. 13, 1999

[51] Int. Cl.[7] ............................ A23L 1/00; B01F 7/00; B01F 7/16
[52] U.S. Cl. .................... 366/294; 99/348; 366/295; 366/296; 366/314
[58] Field of Search ....................... 99/348, 492, 468, 99/484; 366/144–146, 293–296, 314

[56] References Cited

U.S. PATENT DOCUMENTS

| | | | |
|---|---|---|---|
| 5,102,229 | 4/1992 | Wada et al. | 366/294 |
| 5,190,375 | 3/1993 | Shiobara | 366/294 |
| 5,213,415 | 5/1993 | Saeki | 366/294 |
| 5,809,872 | 9/1998 | Sundquist | 99/492 |
| 5,860,357 | 1/1999 | Yung et al. | 99/348 |
| 5,863,121 | 1/1999 | Dunk | 99/348 X |

*Primary Examiner*—Timothy Simone
*Attorney, Agent, or Firm*—Niro, Scavone, Haller & Niro

[57] ABSTRACT

The present invention relates to a blender that employs a combination of mixing blades and a stirring bar that are capable of producing rotational mixing action and rotational stirring action. The invention includes mixing blades which are in communication with a drive source for the production of rotational movement and the use of a gear reduction transmission to provide rotational stirring action that operates at a slower rate of speed than the mixing blades.

2 Claims, 5 Drawing Sheets

INTEGRATED DUAL MIXING ACTION STIRRING BLENDER

BACKGROUND OF THE INVENTION

The present invention relates generally to a food preparation apparatus, and more particularly, to a blender that employs mixing blades and an integrated stirring apparatus capable of producing rotational movement. An electric motor acts as the drive source that produces the rotational movement of the mixing blades. Rotational movement of the stirring apparatus is also produced by the same motor in combination with a speed reduction transmission that rotates the stirring apparatus at a slower speed independent of the mixing blades.

SUMMARY OF THE INVENTION

The purpose of this invention is to provide a food preparation apparatus that increases the mixing efficiency over that typically associated with the blenders currently available in the marketplace in which the only mixing action performed is by the mixing blades. Not only does my invention impart rotational movement to the mixing blades, as with the conventional devices, my invention also uses an integrated stirring bar to aid in the mixing process. Typically, blenders currently available on the market use only the mixing blades to mix and create the mixing current within the container. Typically, current blenders often experience a limited mixing cycle after which the mixed material compacts and prevents un-mixed material from being processed by the mixing blades.

My invention solves the problems typically associated with the current blenders by providing an integrated stirring bar as well as mixing blades, which work in combination to cycle the material into the mixing blades and prevents material compaction as well as providing continuous stirring of the material.

Accordingly, an object of the present invention is to provide a food preparation apparatus which is more efficient than those currently available.

Another object of the present invention is to provide a food preparation apparatus which has a combination of mixing blades and stirring apparatus that operate at different rates of rotational speed.

Another object of the present invention is to provide a food preparation apparatus which uses a single motor to drive both the mixing blades and the stirring apparatus.

BRIEF DESCRIPTION OF THE DRAWINGS

These and other features, objects and advantages of the present invention will become apparent from the following description and drawings wherein like reference numerals represent like elements in the several views, and in which.

DETAILED DESCRIPTION OF THE PREFERRED EMBODIMENTS

Figure 1:
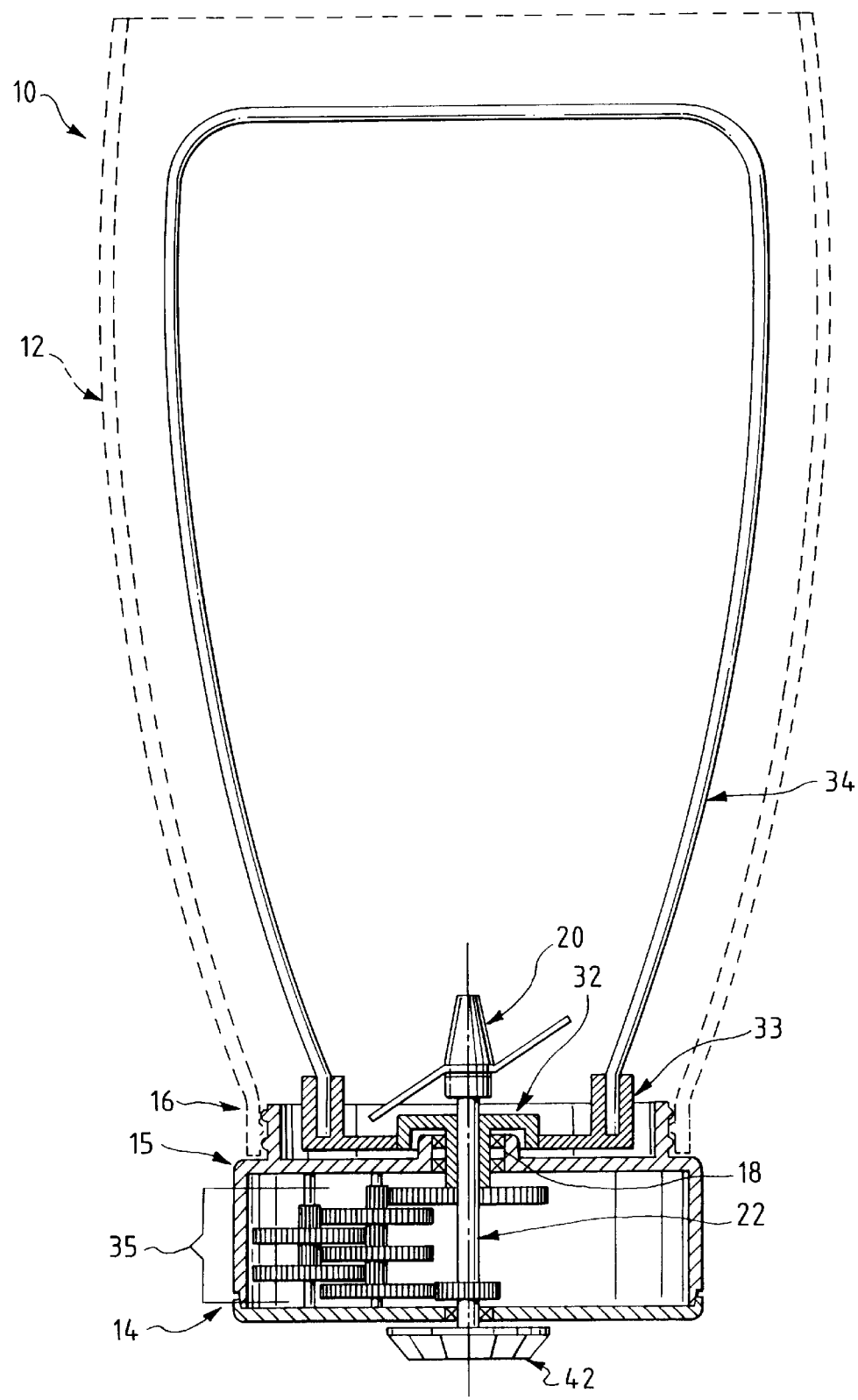
FIG. 1 is a cross-sectional view of one embodiment of the present invention.
Figure 2:
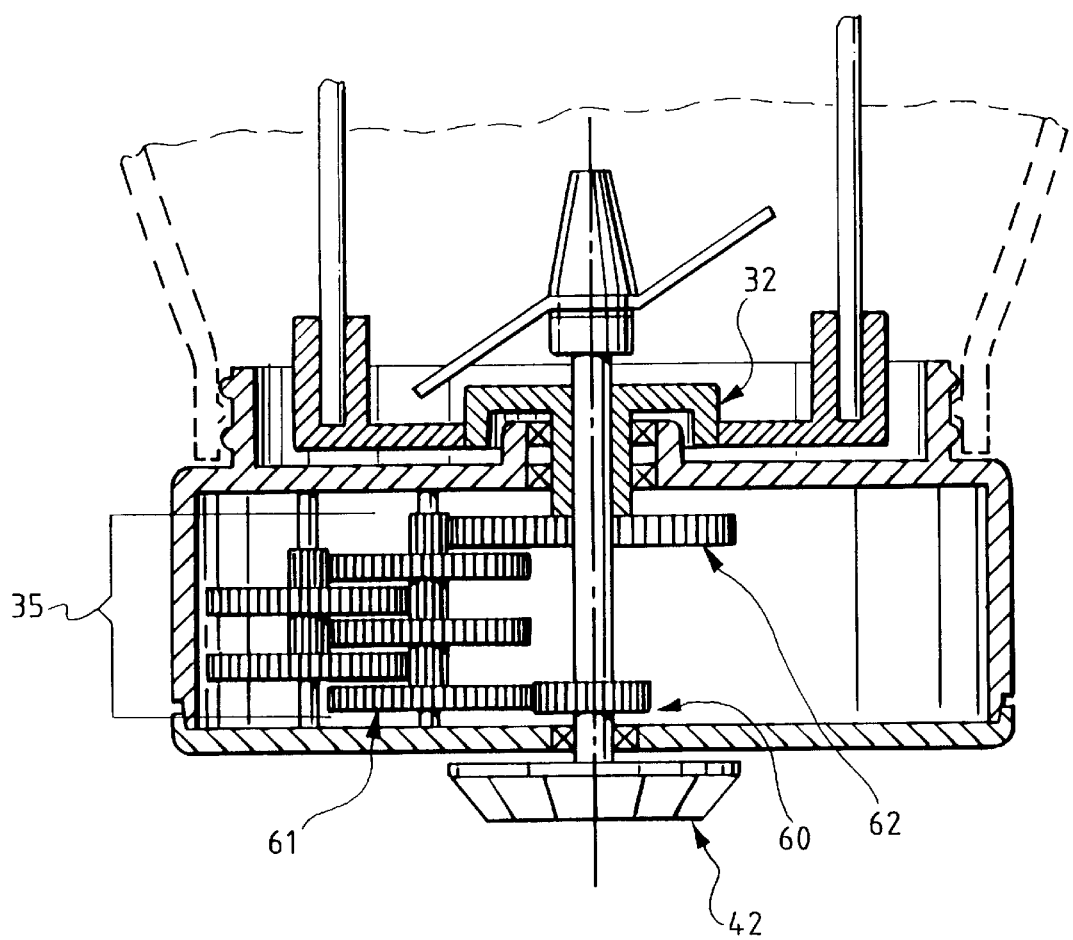
FIG. 2 is a larger perspective view of the transmission of the embodiment of the present invention.

In accordance with a preferred embodiment of the present invention, the food preparation apparatus, such as that shown in FIG. 1, consists of a blender 10 having a pitcher 12, attachable transmission 14 having an outer housing 15, and an electric motor (not shown). Pitcher 12 is coupled to transmission housing 15 by attachment ring 16 formed on housing 15 which further includes a shaft seal 18 and may further use other seals to form a liquid barrier when pitcher 12 is attached. When assembled, mixing blade 20, which is attached to first shaft 22, and the stirring apparatus is located within the mixing chamber of pitcher 12.

As shown in FIG. 1, contained within housing 15 are the components of transmission 14, second shaft 34, and speed reduction gears 35. A second shaft seal 18 again provides a barrier which separates the inner contents from the outside environment and further provides a bearing surface for the rotation of second shaft when coupled to an electric motor via motor attachment ring 42.

As shown in FIG. 1, rotational drive shaft 22 is used to produce rotational movement which is directly linked to the speed of the electric motor. As shown, mixing blades 20 are directly connected to the motor by a single shaft 22.

Figure 3:
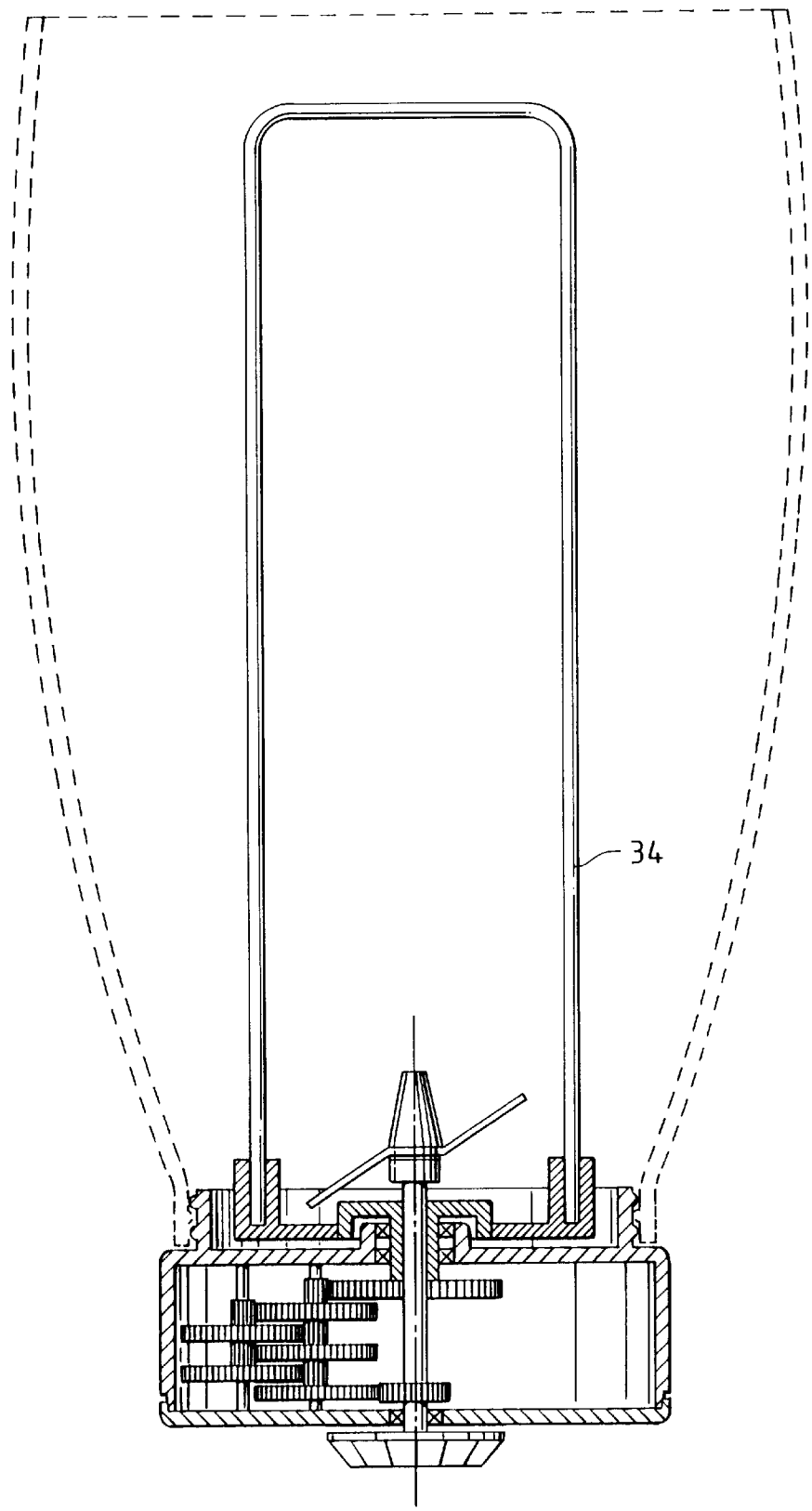
FIGS. 3, 4 and 5 show various embodiments of a removable stirring apparatus.
Figure 4:
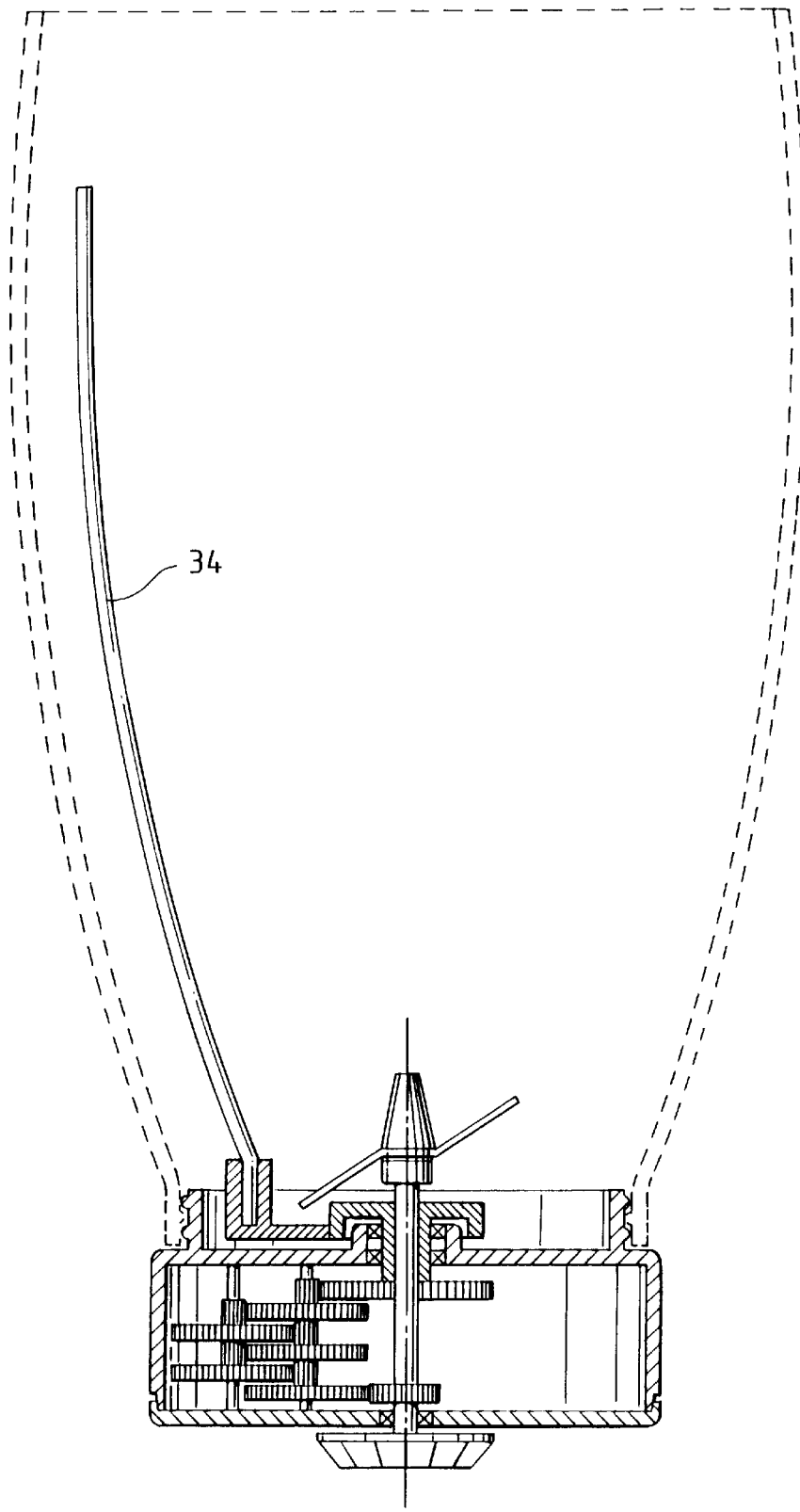
Figure 5:
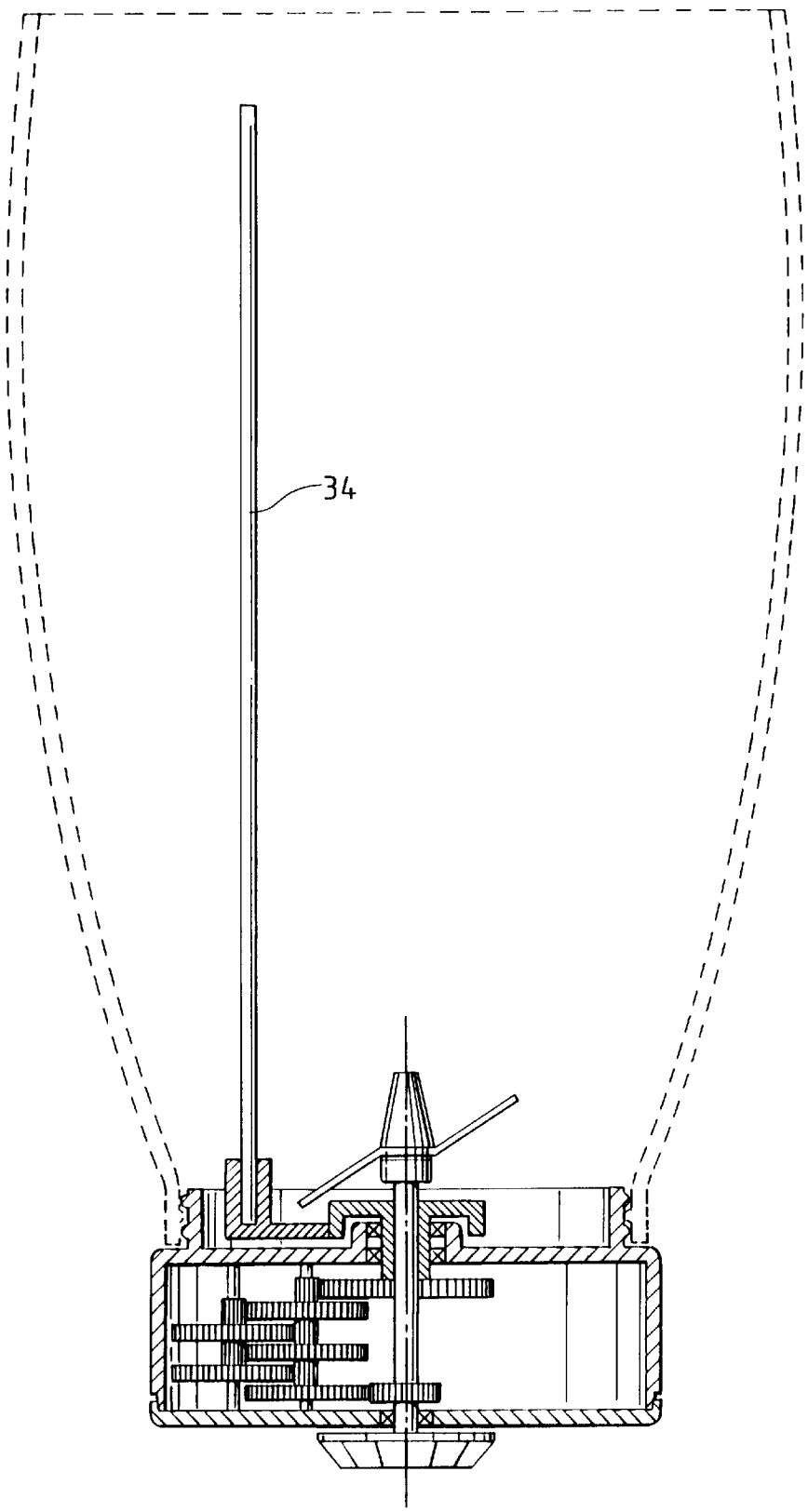

The stirring bars outer drive shaft 32 is driven by speed reduction gears 35 which directly link drive system 35 to the electric motor but at a reduced operational speed. First gear 60 is connected to the first shaft 18 and engages second gear 61 which is the first gear of a combination of gears that drive the outer stirring shaft 32 by engaging a gear ring 62 located at the bottom of the outer shaft 32 which is attached to the removable stirring apparatus 33. The removable stirring apparatus 34 may be a continuous loop, as shown in FIG. 1, extending upward into the pitcher 12, with both ends of the loop attaching to the stirring base 33, or a single stirring bar, with one end attached to the stirring base 33, and the opposite end extending upward into the pitcher 12, as shown in FIGS. 3, 4, and 5.

By stirring the material as blades 20 rotate, the material is both continuously agitated and prevented from binding in addition to providing further contact by blades 20. Continuous movement of the material is beneficial since it prevents material from being conveyed away from the path of blades 20 by the currents generated inside pitcher 12. As the stirring bar 34 travels in an rotational or counter-rotational direction, it continuously moves material in and out of the mixing blade, thus aiding in a more efficient mixing operation.

While the preferred embodiments of the present invention have been illustrated and described, it will be understood by those of ordinary skill in the art that changes and other modifications can be made without departing from the invention in its broader aspects. For example, it would be readily apparent to those of skill in the art that the mixing apparatus may be comprised of one or more upwardly extending paddles or mixing bars. It is therefore intended that such changes and modifications be covered by the following claims.

What is claimed is:

1. A blender for preparing food comprising:

a container, transmission, and electric motor;

said container having an upper portion defining an opening for receiving food and a lower portion attachable to said transmission;

said transmission further including a housing with a drive shaft disposed therein that is operatively connected to said electric motor;

a mixing blade operatively connected to said drive shaft and located in said lower portion of said container, said mixing blade rotated by the operation of said electric motor; and a stirring bar located in said lower portion of said container and extending upwardly into said container, said stirring bar operatively connected to a speed reducer contained within said housing of said transmission, said speed reducer operatively driven by said electric motor and rotates said stirring blade at a rotational rate which is slower than the rotational rate of said mixing blades.

2. The device of claim 1 wherein said speed reducer is comprised of gears.

\* \* \* \* \*